May 25, 1965  W. F. GRASSE  3,184,854
POSITION PLOTTER
Filed Jan. 10, 1961  4 Sheets-Sheet 1

INVENTOR.
WALTER F. GRASSE
BY
Brumbaugh, Free, Graves & Donohue
his ATTORNEYS

May 25, 1965 W. F. GRASSE 3,184,854
POSITION PLOTTER
Filed Jan. 10, 1961 4 Sheets-Sheet 2

INVENTOR.
WALTER F. GRASSE
BY
Brumbaugh, Free, Graves & Donohue
his ATTORNEYS

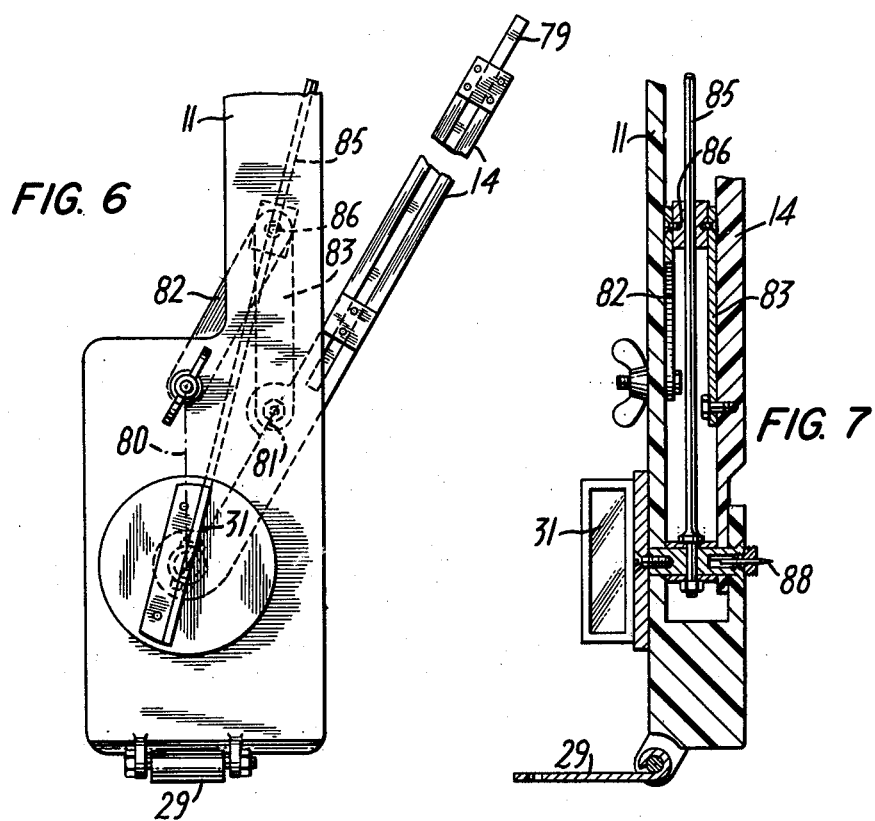

INVENTOR.
WALTER F. GRASSE

United States Patent Office 3,184,854
Patented May 25, 1965

3,184,854
POSITION PLOTTER
Walter F. Grasse, Northport, N.Y., assignor to Fairchild Hiller Corporation, a corporation of Maryland
Filed Jan. 10, 1961, Ser. No. 81,805
5 Claims. (Cl. 33—67)

The present invention relates to novel and highly effective means for ascertaining and plotting the position of an observer, such as a navigator, on a map or chart and, more particularly, to a unitary apparatus whereby a position may be ascertained and plotted without the reading of a compass, the memorizing of the value of an angle or, in some cases, the drawing of a line.

One of many obvious applications of the invention is in the piloting of small craft. In the piloting of ocean-going commercial and military ships by means of a compass, an alidade and a parallel-motion device, it is customary to employ several persons, one or more of whom obtain a series of bearings on landmarks and another of whom plots the corresponding lines of position on a chart.

On small craft such as pleasure boats, however, it is frequently not practicable for more than one person at a time to be engaged in navigation, and this fact is a source of considerable inconvenience. A single individual finds it necessary to remember observed bearings while preparing to plot them, and, for this reason, some navigators plot each bearing as soon as it is determined and consequently have to shift their attention several times between the alidade and the chart in order to obtain a navigational "fix." Even this procedure does not obviate the need to memorize the bearings, and, if the interval between observations is thus made excessive, it is further necessary to allow for that factor, for example by advancing the earlier line of position in the direction of the vessel's motion.

In order to obviate these problems, other navigators obtain bearings on two or more landmarks before plotting a line of position. However, this procedure increases the inconvenience of having to memorize the observed bearings and the likelihood that, owing to the navigator's faulty memory, a line of position will be incorrectly plotted.

Moreover, the present method of piloting requires the drawing of numerous lines of position on a chart, which lines must be erased each time the chart is used, with the result that the chart may be quickly worn out.

The present invention, accordingly, comprises in certain embodiments methods and apparatus whereby it is possible to plot a position on the basis of a single observation without the memorizing or even noting of the bearings of sighted landmarks, and without the drawing of lines of position on a chart. An exemplary embodiment of the invention may include, for example, an accurately arrestable compass for making a precise record of the bearing of a first landmark and angle-measuring means including two arms and a mirror for duplicating the sighting angle subtended by the first landmark and a second landmark.

For a better understanding of the invention, reference is made to the following detailed description taken in conjunction with the accompanying figures in the drawings, in which:

FIGS. 6 is a plan view of a second embodiment of a part of the apparatus;

FIG. 7 is a sectional view in elevation of the mechanism shown in FIG. 6;

Figure 1:
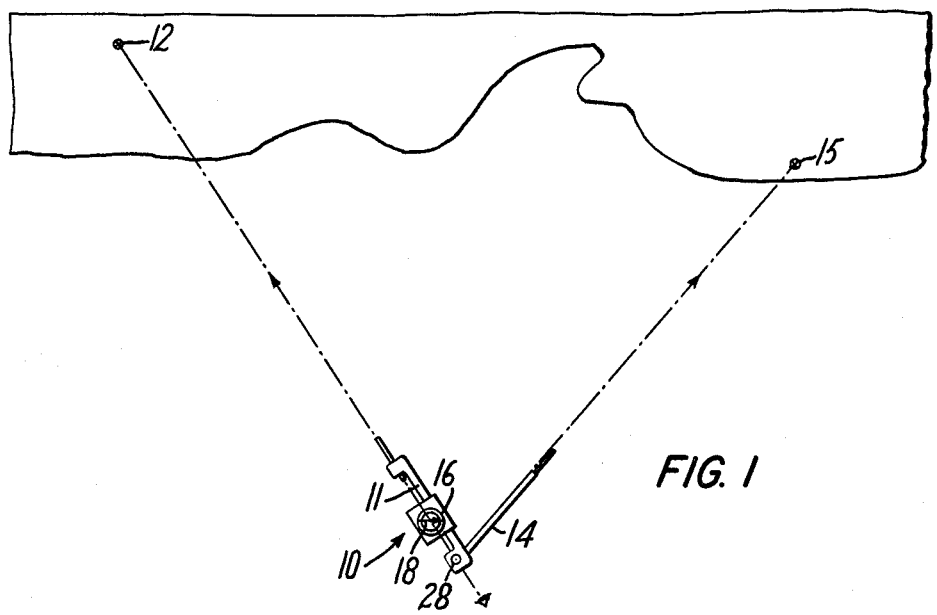
FIGURE 1 is a diagrammatic plan view of one embodiment the apparatus in simplified form and greatly enlarged as compared to the coastline, showing the manner of its use in accordance with the invention for obtaining the bearing of a first landmark while simultaneously measuring the sighting angle subtended by the first landmark and a second landmark.
Figure 2:
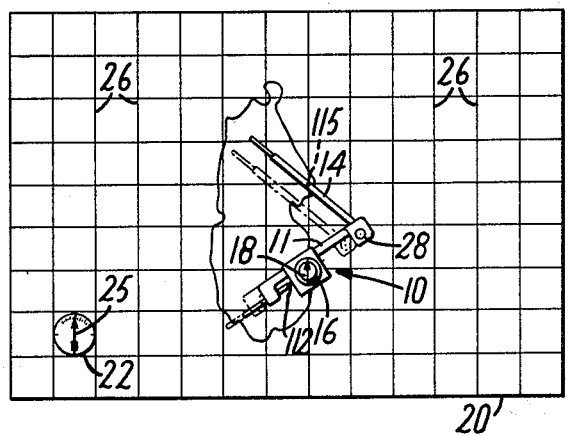
FIG. 2 is a plan view of the apparatus in simplified form, with its parts arrested in the relative positions shown in FIG. 1, illustrating the manner of its application to a chart for plotting a position in accordance with the invention.

FIGS. 1 and 2 illustrate the theory of the invention as embodied in a position plotter 10. In FIG. 1 an observer aligns the optical axis of a first arm 11 of the position plotter 10 with a first landmark 12 and simultaneously directs the optical axis of a second arm 14 toward a second landmark 15. A compass 16 mounted on the first arm 11 has a magnetic needle 18 which indicates approximately the direction of the earth's north magnetic pole. When the observation is made, the arms 11 and 14 and the needle 18 are secured against further rotation with respect to one another. The means of performing the preceding steps and of compensating for magnetic compass error are hereinafter described.

The position plotter 10 is then placed on a chart 20, see FIG. 2, which includes representations 112 and 115 of the landmarks 12 and 15, respectively, and one or more chart-direction indicators such as a compass rose 22 with a north indicator 25 and meridians 26. To plot a position, it is necessary merely to orient the plotter 10 so that the optical axis of the arm 11 is aligned with the representation 112 and the optical axis of the arm 14 is aligned with the representation 115 with the needle 18 parallel to the north indicator 25 or the meridians 26, and place a mark on the chart 20 through a hole 28 at the junction of optical axes of the arms 11 and 14. The mark so placed corresponds to the geographic position of the plotter 10.

The orientation of the plotter 10 and the alignment of the arms 11 and 14 is conveniently accomplished as follows: first the optical axis of the arms 11 is aligned with the representation 112 and the plotter 10 oriented so that the needle 18 is parallel to the chart meridians 26, then the arm 11 is slidably moved with respect to the compass 16 so as to bring the optical axis of the arm 14 into alignment with the representation 115.

Figure 3:
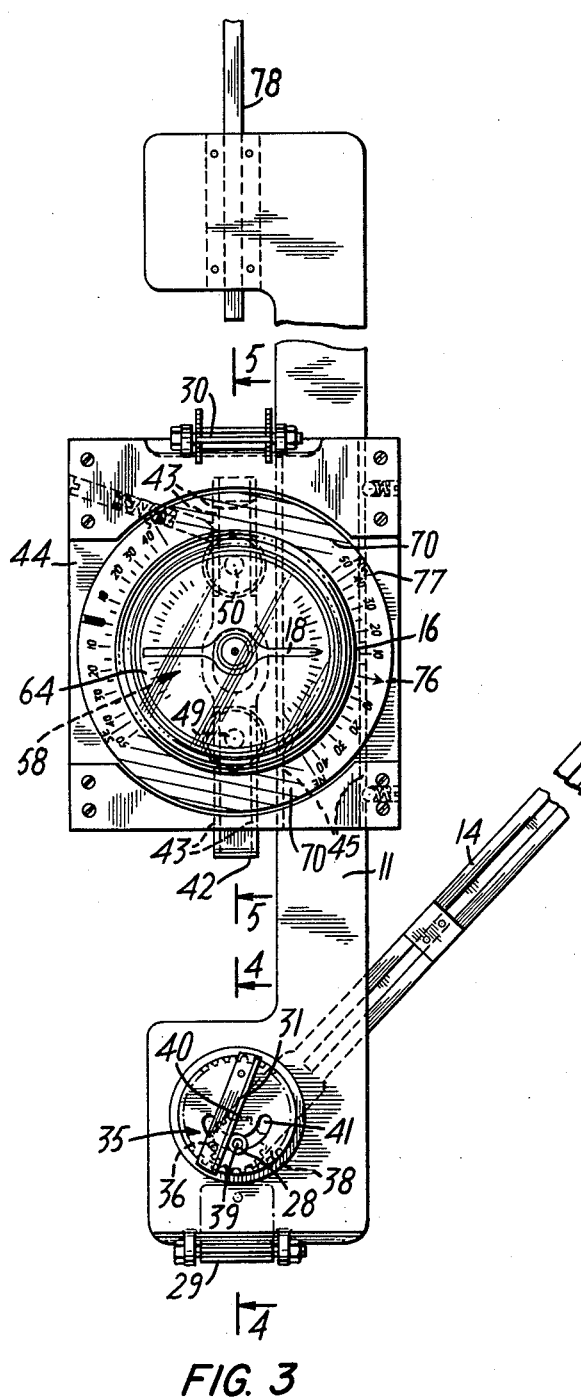
FIG. 3 is a detailed plan view of the apparatus of FIGS. 1 and 2.

FIG. 3 shows in detail the construction of an exemplary embodiment of the new plotter. Sights 29 and 30 facilitate alignment of the optical axis of the arm 11 with the landmark 12. To permit simultaneous alignment of the optical axis of the arm 14 with the landmark 15, the arm 11 is provided with a mirror 31, the plane of which is continuously parallel to a line bisecting the angle formed by the optical axes of the arms 11 and 14, regardless of what that angle may be, so that a reflected image of the landmark 15 is brought into alignment with the arm 11 and the landmark 12 when the arm 14 is directed toward the landmark 15.

The proper angular orientation of the mirror 31 with respect to the arms 11 and 14 is maintained by means of a two-to-one reduction gear indicated generally at 35 and consisting of a pinion 36 rigidly mounted at the inner end of the arm 14, which engages the inwardly projecting teeth of a flanged spool 38. The pinion 36 has a diameter one-half as great as that of the spool 38 and is rotatable about a first axis of rotation 39 halfway between a second axis of rotation 40 of the spool 38 and the circumference of the spool 38. Therefore, the spool 38 will rotate through an angle half as great as any angle through which the arm 14 and the pinion 36 are rotated with respect to the arm 11. Accordingly, if the mirror 31 is initially rigidly positioned on the spool 38 parallel to a line bisecting the angle formed by the optical axes of the arms 11 and 14, the morror 31 will remain parallel to that line regardless of the angle through which the arm 14 is rotated with respect to the arm 11.

The displacement of the mirror 31 from the hole 28 facilitates insertion of a marking means such as a pencil into the hole 28 for the purpose of marking a position on a chart. Inasmuch as the displacement is negligible as compared to the distance between the plotter 10 and the landmarks, no significant error in the measurement of the angle subtended by the landmarks is introduced.

An arcuate slot 41 is provided in the two end plates of the spool 38 so that, as the spool 38 is rotated, within limits, the hole 28 will remain exposed and the position of the plotter 10 can be marked therethrough on the chart 20.

Figure 5:
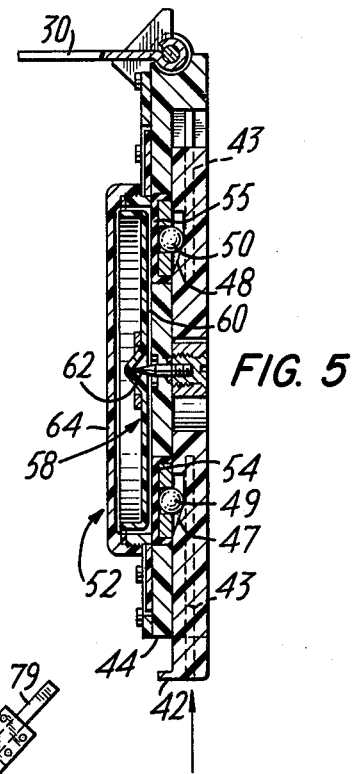
FIG. 5 is a view in elevation taken along the line 5—5 of FIG. 3 and looking in the direction of the arrows.

FIGS. 3 and 5 illustrate the operation of the compass-arresting mechanism. A slide 42 is movable on runners 43 within a compass housing 44, which is slidable in channels 45 in the arm 11. The slide 42 has cam surfaces 47 and 48 engageable with arresting members such as balls 49 and 50. The bottom of a watertight jacket 52 enclosing the compass 16 and rigidly attached to the compass housing 44 consists in part of elastic membranes 54 and 55, which will yield under pressure from the balls 49 and 50. Within the jacket 52 a compass rose 58 is rigidly secured to the needle 18, immersed in a liquid medium 60, and rotatable about a pivot 62.

When the slide 42 is pushed in, to the right as seen in FIG. 5, the balls 49 and 50 are forced against the elastic membranes 54 and 55, which are in turn pressed against the compass rose 58, lifting it up and against the top 64 of the jacket 52.

By this means, the compass needle 18 can be precisely arrested at the moment the sight is taken. Inherent friction, or a set screw or similar device, prevents rotation of the arm 14 with respect to the arm 11 unless a moderate force is applied. Therefore, when the sight is taken, the relative orientations of the arms 11 and 14 and the compass needle 18 can all be rigidly fixed as described in connection with FIG. 1 and the plotter 10 transferred to a chart as described in connection with FIG. 2.

It is well known that on most parts of the earth a magnetic compass does not indicate true north. This magnetic variation, as it is called, is due partly to the presence in the earth of deposits of iron ore and other magnetic substances and partly to the fact that the magnetic north pole does not coincide with the geographic north pole.

In addition, in a vessel containing considerable amounts of magnetic material, there is a further source of error referred to as deviation, which is a function of the heading of the vessel.

Accordingly, the apparatus is provided with a true-north indicator 76 inscribed on an orientation disk 77, which may be so oriented with respect to the compass rose 58 of the compass 16, after the sight has been made and the compass needle 18 has been arrested, as to compensate for variation and deviation. Then, when the plotter 10 is transferred to the chart 20 as described in connection with FIG. 2, the plotter 10 is oriented so that the true north indicator 76, rather than the needle 18, is made parallel to the meridians 26. Parallel markings 70 on the disk 77 facilitate the task of determining when the plotter 10 is properly oriented.

Extensions 78 and 79 on the arms 11 and 14, respectively, permit the plotting of positions on large-scale charts.

Except for the magnetic needle 18, the balls 49 and 50 and perhaps the pinion 36 and the spool 38, the various parts of the apparatus may advantageously be made of a transparent plastic.

FIGS. 6 and 7 show an alternate embodiment of a device for maintaining the mirror 31 in proper relation to the arms 11 and 14. A segment 80 of the arm 11 and a segment 81 of the arm 14 are equal in length. Links 82 and 83, each equal in length to the length of the segment 80 or 81, connect the outer ends of the segments 80 and 81, so that the segments 80 and 81 and the links 82 and 83 form a parallelogram. A rod 85 slidably supports a bracket 86, which pivotally connects the links 82 and 83. The rod 85 bisects the parallelogram and the mirror 31 is aligned with the rod 85, so that the plane of the mirror 31 continuously bisects the angle formed by the arms 11 and 14.

In this embodiment, the mirror 31 is not displaced from the vertex of the angle formed by the optical axes of the arms 11 and 14, and marking means 88 are inserted at the vertex of the angle on the underside of the plotter 10 for marking a position, as shown in FIG. 7.

In both embodiments of the means for maintaining the mirror 31 in proper relation to the arms 11 and 14, the second landmark may be on either side of the first landmark, inasmuch as the arm 14 will swing through center to either side of the arm 11, and both sides of the mirror 31 are reflectors.

It is evident that the embodiments of the invention described thus far are adaptable for determining a position, even without the use of the arm 14 and the mirror 31, in the following manner. The arm 11 is directed toward a landmark, the needle 18 is arrested, and the true-north indicator 76 is oriented with respect to the needle 18 so as to compensate for magnetic variation and deviation.

The needle 18 is then allowed to turn freely and a sight is taken on another landmark, whereupon the needle 18 is again arrested. When the plotter 10 is transferred to a chart a first line of position is obtained by aligning the arm 11 with a representation on the chart of the first landmark with the true north indicator 76 parallel to the meridians on the chart. The true north indicator 76 is then oriented with respect to the plotter 10 so as to compensate for magnetic variation and deviation of the needle 18 in taking the sight on the second landmark, and a second line of position is obtained by aligning the arm 11 with a representation on the chart of the second landmark with the true north indicator 76 parallel to the chart meridians. The intersection of the lines of position determines a point which corresponds to the geographic position of the plotter 10.

Although, when the arm 14 and the mirror 31 are not employed it is necessary to make two observations instead of one and to draw lines of position, it is still possible to fix a position without memorizing or even noting the bearings of sighted landmarks.

Figure 8:
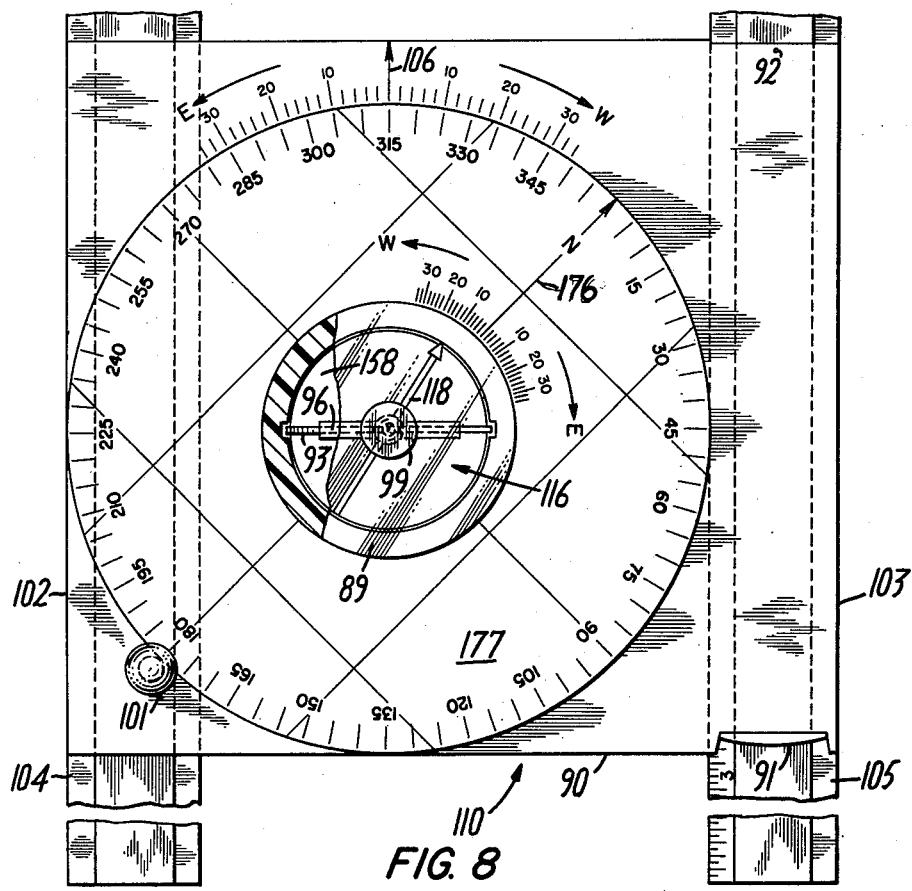
FIG. 8 is a plan view, partially broken away, of another embodiment of apparatus for use in accordance with the invention.
Figure 9:
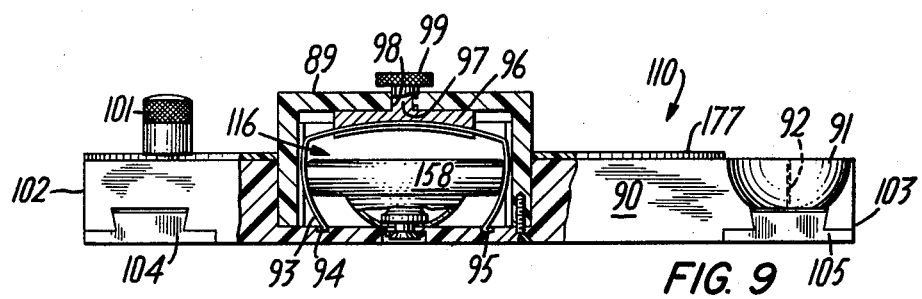
FIG. 9 is a view in side elevation, partly in section and partly broken away, of the apparatus shown in FIG. 8.

FIGS. 8 and 9 show another embodiment of the invention, which turns to account the ability of a plotter 110 constructed in accordance with the invention to function efficiently without the arm 14 or the mirror 31.

In FIG. 8 a compass 116 is enclosed in a transparent plastic housing 89 which is mounted in a flat transparent plastic plate 90. The plate 90 is provided with a sight comprising a collimating lens 91 and an opaque phosphorescent index line 92 in the focal plane of the lens 91. Because the light traveling from the line 92 through the lens emerges in parallel rays, the accuracy of the sight is unaffected by relative movement of the eye with respect to the plotter 110, so long as the line 92 remains visible through the lens 91.

The compass 116 is arrested by a deformable member such as a wire 93 having a generally horseshoe shape. The wire 93 extends vertically along opposite sides of the compass 116 and across the top thereof, and its ends 94 and 95 are anchored to the plate 90.

The wire 93 is channeled along part of its length above the compass 116 in a guide 96 which is connected by a short shaft 97 through an aperture 98 in the housing 89 to a button 99.

Figure 11:
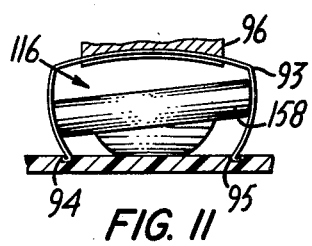
FIG. 11 is similar to FIG. 10, except that the compass is shown in an arrested condition.
Figure 10:
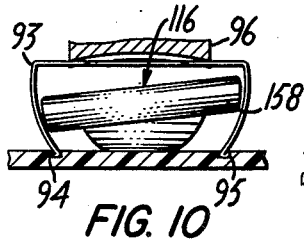
FIG. 10 is a view of the compass-arresting mechanism of the embodiment of FIGS. 8 and 9, showing the compass in a released or freely rotatable condition and tilted through a vertical angle with respect to the compass-arresting mechanism.

When the button 99 is depressed, the guide 96 forces the top of the wire 93 downwardly until it is approximately in a straight line, thus bowing the vertical portions of the wire 93 outwardly and releasing the compass 116 so that it turns freely. The compass 116 is damped, for example by eddy currents, so that it quickly comes to rest, its orientation being determined by the surrounding magnetic field. When the button 99 is released the wire 93 springs back to its original shape and clamps the compass 116 to arrest it. The "vertical" portions of the wire 93 are not in fact perfectly vertical but are curved to form arcs of a circle. Inasmuch as the surface of the peripheral wall of a compass rose 116, to which a needle 118 is rigidly connected, is a segment of a sphere concentric with the arcs, it is firmly gripped by the wire 93 even though it may have moved through an appreciable vertical angle with respect to the housing 89. See FIG. 11.

When a sight has thus been made, variation and deviation are compensated for in the manner previously set forth by means of an orientation disk 177 which is arrestable by a thumb screw 101. A sight on a second landmark is then made. When the plotter 110 is transferred to a chart, a true-north indicator 176 on the orientation disk 177 is oriented in accordance with a true-north indicator on the chart, and a straight edge 102 or 103 of the plotter 110 is aligned with the first-sighted landmark. The edges 102 and 103 are parallel to the sight formed by the lens 91 and the line 92. After a first line of position is plotted along the edge 102 or 103, the orientation disk 177 is rotated so as to compensate for variation and deviation of the compass 116 in obtaining the second sight. A second line of position is plotted by aligning either of the edges 102 and 103 with a representation on the chart of the second landmark with the compass 116 oriented as before. The intersection of the two lines of position fixes the position of the observer.

Two protractor arms 104 and 105 have edges coinciding with and extending from the edges 102 and 103 and facilitate plotting on large-scale charts.

The plotter 110 is obviously adapted to be used as a course plotter. The desired true course as indicated on the outer edge of the orientation disk is set opposite a course index 106 on the plate 90. When the true-north indicator 176 on the orientation disk 177 is oriented in accordance with a true-north indicator on a chart, the edges 102 and 103 will lie parallel to the desired course. If either of the edges 102 and 103 is extended through a point on the chart corresponding to the vessel's geographic position, it will indicate where the desired course will take the vessel. In FIG. 8 a true course of 315° is indicated. A magnetic course can be obtained by applying variation by means of a corrector on the plate 90.

Thus there is provided in accordance with the present invention a unitary apparatus whereby it is possible to ascertain and plot a position without the reading of a compass, the memorizing or even noting of the bearings of sighted landmarks or, in some cases, the drawing of lines of position on a chart.

Figure 4:
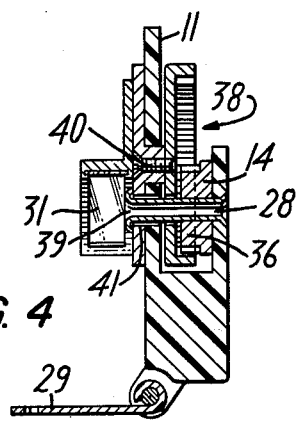
FIG. 4 is a view in elevation taken along the line 4—4 of FIG. 3 and looking in the direction of the arrows.

The embodiments described above are merely exemplary and are obviously susceptible of modification in form and in detail within the spirit and scope of the invention. For example, although in the embodiment of FIGS. 3 and 4 the mirror 31 is displaced from the vertex of the angle formed by the optical axes of the arms 11 and 14 in the embodiment of FIGS. 6 and 7 the mirror 31 is not so displaced, it is clear from the disclosure that all four permutations of the two embodiments and the two mirror locations are possible. Therefore, the invention is to be construed as limited only by the appended claims.

I claim:

1. A position plotter, comprising a first arm, a compass carried by said first arm for obtaining and indicating the bearing of a first landmark relative to the axis of the earth, a mirror and a second arm for simultaneously measuring the sighting angle subtended from the position of said plotter by said first landmark and a second landmark, arresting means for selectively maintaining a constant angular orientation of the bearing indicated by said compass with respect to said arms, and means at the vertex of said sighting angle facilitating placement of marks on a chart.

2. A position plotter, comprising a first arm alignable with a first landmark, a second arm rotatable about a first axis intersecting said first arm and alignable with a second landmark, a plane mirror pivotable about a second axis parallel to said first axis, means for rotating said mirror about said second axis so that the plane of said mirror is continuously parallel to a line bisecting the angle formed by said first and second arms with respect to each other, a compass having a compass needle and a compass rose rigidly attached together, rotatable about a pivot, and immersed in a liquid medium, said compass, said liquid medium and a part of said pivot being enclosed with a watertight jacket, a part of which is elastic, a housing for said jacket slidably attached to said first arm, an arresting member adjacent to said elastic part of said jacket, a slide movable in said housing adjacent to said arresting member, a cam surface on said slide, whereby, when said slide is moved so that said cam surface engages said arresting member, said arresting member depresses said elastic part of said jacket against said compass rose and maintains a constant angular orientation of said compass with respect to said arms, a true-north indicator angularly orientable with respect to said compass rose so as to compensate for magnetic variation and deviation, and means on said first axis facilitating placement of marks on a chart.

3. A position plotter, comprising a first arm along which a first landmark can be sighted, a second arm rotatable about an axis intersecting said first arm and alignable with a second landmark, a plane mirror mounted coaxially with respect to said axis, means for rotating said mirror about said axis so that the plane of said mirror continuously bisects the angle subtended by said first and second arms, a compass having a compass needle and a compass rose rigidly attached together, rotatable about a pivot, and immersed in a liquid medium, said compass rose, said liquid medium and a part of said pivot being enclosed with a watertight jacket, a part of which is elastic, a housing for said jacket rigidly attached to said first arm, an arresting member adjacent to said elastic part of said jacket, a slide movable in said housing adjacent to said arresting member, a cam surface on said slide, whereby, when said slide is moved so that said cam engages said arresting member, said arresting member depresses said elastic part of said jacket against said compass rose and maintains a constant angular orientation of said compass with respect to said arms, a true north indicator angularly orientable with respect to said compass rose so as to compensate for magnetic variation and deviation, and marking means on said axis for placing a mark on a chart.

4. Apparatus for determining the position of an observer comprising a compass, said compass including a rotatable needle and a compass rose, which is a segment of a sphere, a transparent plate on which said compass is mounted, said plate having a straight edge, arresting means for selectively maintaining a constant angular orientation of said needle with respect to said straight edge, said arresting means comprising a deformable wire in the shape of an arc of a circle concentric with said segment of a sphere and adapted to engage the same, a hand-operated button which forces a guide against said wire, and a sight having optical axis parallel to said straight edge for seeking landmarks.

5. An arrestable compass comprising a needle adapted to indicate a known compass direction, a compass rose in the shape of a segment of a sphere rigidly attached to said needle, a deformable member for selective engagement with an disengagement from said compass rose, said deformable member forming an arc of a circle concentric with said segment of said sphere, and means for placing said deformable member in a deformed and an undeformed condition.

References Cited by the Examiner
UNITED STATES PATENTS

| | | | |
|---|---|---|---|
| 43,036 | 6/64 | Martin | 33—224 |
| 215,749 | 5/79 | Humphrey | 33—69 |
| 590,696 | 9/97 | Batson | 33—67 |
| 725,073 | 4/03 | Gouyard | 33—63 X |
| 830,769 | 9/06 | Chandler | 33—67 |
| 848,757 | 4/07 | Lomb et al. | 33—50.5 |
| 1,115,774 | 11/14 | Berger | 33—224 |
| 1,945,323 | 1/34 | Lewis | 33—67 |
| 1,973,716 | 9/34 | Karnes | 33—222.5 |
| 2,328,517 | 8/43 | Von Opel | 33—67 |
| 2,336,790 | 5/42 | Jonsson | 33—222.5 |
| 2,340,512 | 2/44 | De Swart | 33—222.5 |

FOREIGN PATENTS

| | | |
|---|---|---|
| 6,571 | 3/12 | Great Britain. |
| 166,589 | 7/21 | Great Britain. |
| 321,256 | 11/29 | Great Britain. |
| 51,973 | 1/33 | Norway. |
| 65,468 | 11/42 | Norway. |

ISAAC LISANN, *Primary Examiner.*